United States Patent
Leary et al.

(10) Patent No.: US 9,729,929 B2
(45) Date of Patent: Aug. 8, 2017

(54) CHANNEL TUNING WITH SYNTHESIZED KEY CODES

(71) Applicant: ARRIS Enterprises, Inc., Suwanee, GA (US)

(72) Inventors: Patrick J. Leary, Horsham, PA (US); Scott Green, North Wales, PA (US); Krishna Prasad Panje, Bangalore (IN)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/455,352

(22) Filed: Aug. 8, 2014

(65) Prior Publication Data

US 2016/0044359 A1 Feb. 11, 2016

(51) Int. Cl.
| | |
|---|---|
| H04N 7/16 | (2011.01) |
| H04N 21/462 | (2011.01) |
| H04N 21/482 | (2011.01) |
| H04N 21/422 | (2011.01) |
| H04N 21/438 | (2011.01) |
| H04N 21/458 | (2011.01) |

(52) U.S. Cl.
CPC ... *H04N 21/4622* (2013.01); *H04N 21/42204* (2013.01); *H04N 21/4383* (2013.01); *H04N 21/4583* (2013.01); *H04N 21/482* (2013.01)

(58) Field of Classification Search
CPC .................. H04N 21/42207; H04N 21/42219
See application file for complete search history.

(56) References Cited

U.S. PATENT DOCUMENTS

| | | | | |
|---|---|---|---|---|
| 5,436,676 A | * | 7/1995 | Pint | H03J 1/0025 348/734 |
| 6,101,368 A | * | 8/2000 | Farnsworth | H04N 5/4401 348/E5.108 |
| 6,144,376 A | * | 11/2000 | Connelly | H04N 5/4401 348/552 |
| 6,181,326 B1 | * | 1/2001 | Takahashi | G06F 3/002 345/158 |
| 2001/0017616 A1 | * | 8/2001 | Kobayashi | H04N 5/44582 345/173 |
| 2002/0180807 A1 | * | 12/2002 | Dubil | H04N 5/44582 715/840 |
| 2002/0194299 A1 | * | 12/2002 | Yasaki | H04N 5/4403 709/217 |
| 2003/0117427 A1 | * | 6/2003 | Haughawout | G01C 21/3682 715/710 |
| 2004/0108940 A1 | * | 6/2004 | Witkow | G08C 17/00 340/4.41 |
| 2004/0135819 A1 | * | 7/2004 | Maa | G06F 3/0481 715/840 |
| 2006/0020999 A1 | * | 1/2006 | Schlarb | G08C 23/04 725/153 |

(Continued)

*Primary Examiner* — Pankaj Kumar
*Assistant Examiner* — Timothy Newlin
(74) *Attorney, Agent, or Firm* — Bart A. Perkins (57) ABSTRACT

Methods, systems, and computer readable media can be operable to facilitate integrating and coordinating content requests received by a STB from multiple devices. The methods, systems, and apparatuses described in this disclosure enable the integration and coordination of content requests received from different devices by associating a content request with a key code and generating a synthesized key code. The synthesized key code can be customized according to a status of a corresponding STB.

20 Claims, 4 Drawing Sheets

(56) References Cited

U.S. PATENT DOCUMENTS

| | | | |
|---|---|---|---|
| 2006/0041923 A1* | 2/2006 | McQuaide | H04M 1/575 725/131 |
| 2009/0073126 A1 | 3/2009 | Srivastava | |
| 2009/0081950 A1* | 3/2009 | Matsubara | H04H 60/80 455/3.06 |
| 2009/0129745 A1* | 5/2009 | Kinoshita | H04N 5/782 386/299 |
| 2009/0207319 A1* | 8/2009 | Satoh | H04N 5/4403 348/734 |
| 2010/0017736 A1* | 1/2010 | Kim | G08C 17/02 715/771 |
| 2010/0245134 A1* | 9/2010 | Black | G06F 3/0219 341/23 |
| 2010/0328547 A1* | 12/2010 | Mayorga | G06F 13/385 348/734 |
| 2011/0050478 A1* | 3/2011 | Choi | G08C 17/02 341/176 |
| 2011/0140948 A1* | 6/2011 | Friedman | H04N 5/4403 341/176 |
| 2012/0079551 A1* | 3/2012 | Isozaki | H04N 21/4104 725/118 |
| 2012/0144434 A1 | 6/2012 | Smith | |
| 2012/0188113 A1* | 7/2012 | In | G08C 17/02 341/176 |
| 2012/0210371 A1* | 8/2012 | McCoy | H04N 21/42219 725/62 |
| 2013/0132094 A1* | 5/2013 | Lim | G10L 15/22 704/275 |
| 2013/0191553 A1* | 7/2013 | Wyler | H04L 12/282 710/5 |
| 2013/0332979 A1* | 12/2013 | Baskaran | H04N 21/4222 725/132 |
| 2014/0253298 A1* | 9/2014 | Srivastava | G05B 11/01 340/12.5 |
| 2015/0015380 A1* | 1/2015 | Choi | G08C 17/02 340/12.22 |

* cited by examiner

CHANNEL TUNING WITH SYNTHESIZED KEY CODES

TECHNICAL FIELD

This disclosure relates to requesting and receiving content from a set-top box through a client device.

BACKGROUND

Typically, a set-top box (STB) is designed to tune to a channel and playback content in response to a subscriber request for content, the request being received from a subscriber via a remote control. For example, the subscriber enters a channel number or otherwise selects content associated with a specific channel using a remote control; the remote control transmits a key code (e.g., a command recognized by the STB) associated with the channel or content selection to the STB; the STB tunes to a frequency associated with the specific channel, or retrieves a packet stream associated with the requested content; and the STB outputs content associated with the specific channel to a display device. Generally, a key code is transmitted from a remote control to a STB via an infrared (IR), radio frequency (RF), ultra high frequency (UHF) (e.g., Bluetooth communication), or other wireless communication.

The advent of networked client devices (e.g., devices that are connected to a common network), such as Digital Living Network Alliance (DLNA) devices, within the home has created a mixture of different interfaces through which subscribers may consume multimedia. Once connected to a network, networked client devices can communicate and interact with each other, and networked client devices can be capable of providing a user interface that allows a user to cause a STB to tune to a specific channel according to a request from the user. In embodiments, networked client devices transmit a request to a STB by sending a uniform resource identifier (URI) (e.g., a character string identifying a specific web and/or network resource) instead of a key code. Generally, user interfaces for networked client devices and user interfaces for STBs are not integrated and are not cooperative, thus conflicts for tuner access at a STB can occur. Therefore, a need exists for improving methods and systems for facilitating communications between networked client devices and STBs.

BRIEF DESCRIPTION OF THE DRAWINGS

Like reference numbers and designations in the various drawings indicate like elements.

DETAILED DESCRIPTION

It is desirable to improve upon methods and systems for processing a request for content received at a STB from a networked client device. Methods and systems are described herein for synthesizing a key code based upon a request received from a networked client device and resolving conflicts arising between the networked client device request and subscriber input received through an interface at the STB. The synthesized key code can be received by an interface of the STB, and the synthesized key code can be treated as a communication carrying a standard key code.

Figure 1:
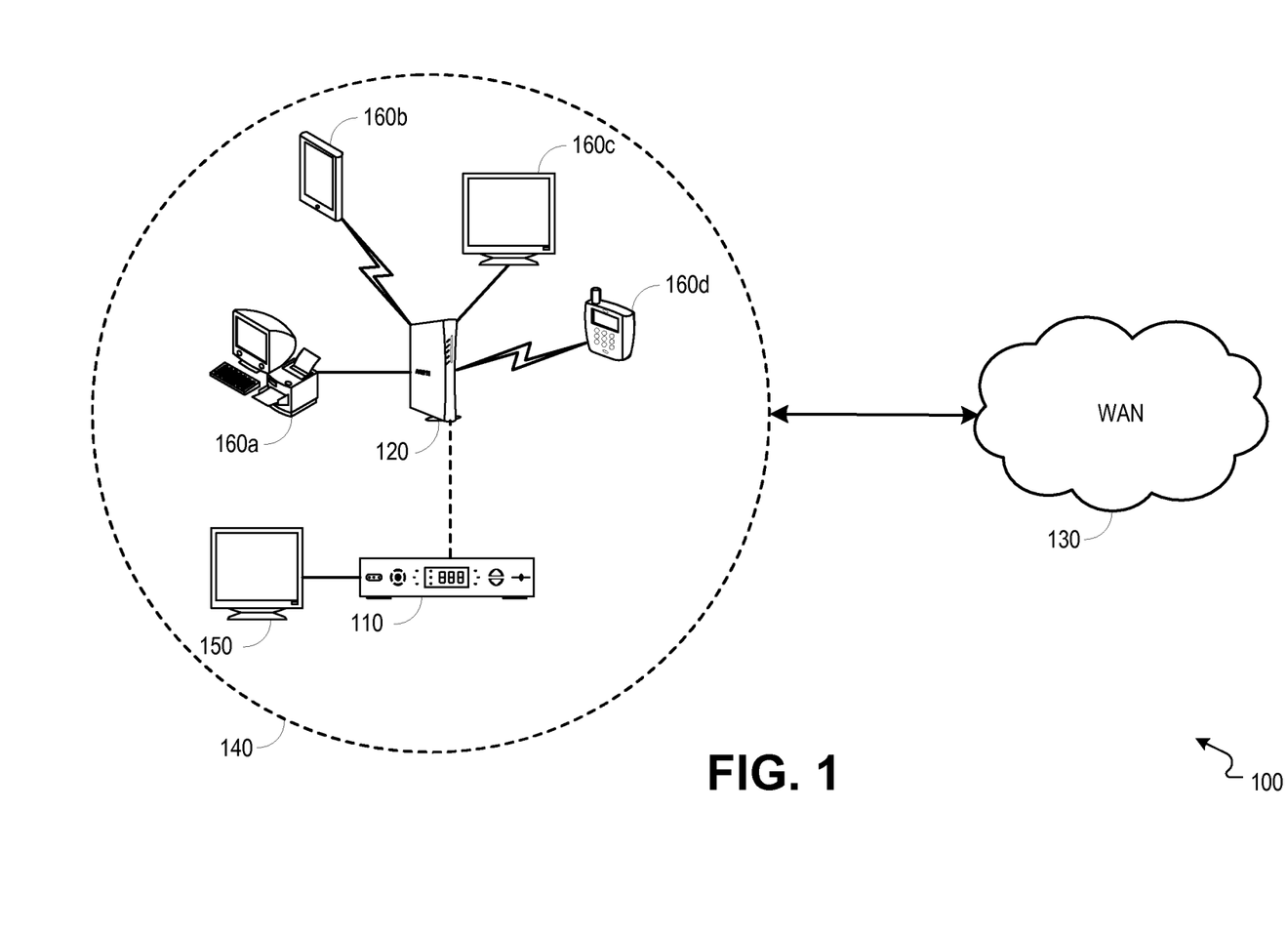
FIG. 1 is a block diagram illustrating an example network environment operable to facilitate the tuning of a STB using a synthesized key code.

FIG. 1 is a block diagram illustrating an example network environment 100 operable to facilitate the tuning of a STB using a synthesized key code. In embodiments, one or more customer premise equipment (CPE) devices (e.g., STB 110, gateway 120, other devices that are not shown such as a modem, a wireless router including an embedded modem, digital subscriber line (DSL) modem, voice over internet protocol (VOIP) terminal adapter, video game console, digital versatile disc (DVD) player, communications device, hotspot device, etc.) provide video and/or data services to a subscriber by communicating with a wide area network (WAN) 130 through a connection to a network 140 (e.g., a local area network (LAN), a wireless local area network (WLAN), a personal area network (PAN), etc.). For example, a subscriber can receive and request video and/or data services through a STB 110, or through a television 150 connected to a STB 110, and can receive and request video and/or data services from networked client devices 160a-d (e.g., computer, tablet, television, mobile device, etc.) through a connection to a gateway 120. In embodiments, a gateway 120 can communicate with a STB 110 over a wired or a wireless connection. While the components shown in FIG. 1 are shown separate from each other, it should be understood that the various components can be integrated into each other (e.g., the gateway 120 can be integrated into a STB 110).

In embodiments, networked client devices 160a-d communicate with each other and with other devices that are connected to the same network 140 as the gateway 120. For example, networked client devices 160a-d can request and receive content from the STB 110. Content available on the STB 110 (e.g., live channels, stored content, etc.) can be exposed to and identified by networked client devices 160a-d using a channel or content directory (e.g., content directory service). A networked client device 160a-d can receive a channel or content directory and a subscriber can browse the directory for available channels or content. Content can be delivered to and received by client devices 160a-d via one or more frequencies associated with a program and/or one or more Internet protocol (IP) packet streams.

In embodiments, a plurality of devices using various interface applications can exist in the same network, and conflicts can arise when different devices having different interface applications attempt to communicate with each other. For example, one or more of the networked client devices 160a-d can use different interface applications than a STB 110. The STB 110 can have a user interface application that accepts key codes input by a subscriber and tunes to a channel associated with the key code, and one or more networked client devices 160a-d can request channels or content from the STB 110 by transmitting URI requests to the STB 110, the URI requests being associated with specific channels or content available on the STB 110. For example, a channel or content within a channel or content directory can be selected at a networked client device 160a-d, and a URI request (e.g., Hypertext Transfer Protocol (HTTP) "get" request) identifying the selected channel or content can be output to a STB 110.

In embodiments, the STB 110 associates a URI request with a channel number and a corresponding key code. For example, the STB 110 can use a channel or content directory (e.g., content directory service) to identify a channel number and/or key code associated with a received URI request, and the STB 110 can translate the received URI request into a corresponding key code (e.g., a synthesized key code or key code sequence). In embodiments, the synthesized key code is a sequence of key codes associated with a content source (e.g., a content location such as a channel, internal storage location, external sever location, etc.) and/or one or more commands to be carried out by a STB 110. The STB 110 can then process the URI request as a key code (e.g., the STB 110 can process the synthesized key code), and key codes that are translated from URI requests can be coordinated with other key codes. For example, the same conflict resolution procedures can be applied to requests for content and/or channels received by a STB 110 as URI requests and those received by the STB 110 as key codes.

Figure 2:
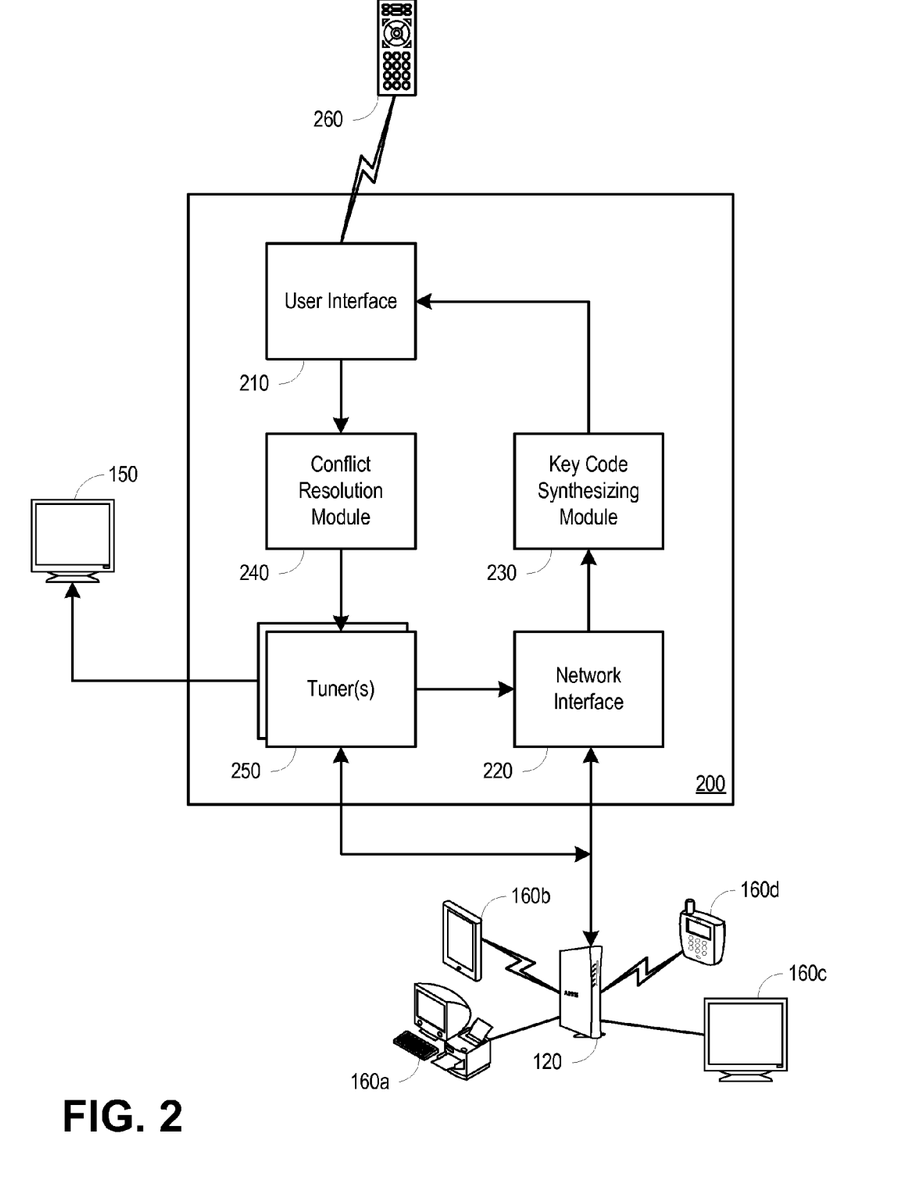
FIG. 2 is a block diagram illustrating an example component operable to generate a synthesized key code based upon a request received from a networked client device.

FIG. 2 is a block diagram illustrating an example component 200 operable to generate a synthesized key code based upon a request received from a client device. The component 200 can include a user interface 210, a network interface 220, a key code synthesizing module 230, a conflict resolution module 240, and one or more tuners 250. In embodiments, the component 200 is within a STB 110.

In embodiments, the component 200 can receive a subscriber request for content through the user interface 210. For example, the subscriber request can be received from a controller 260 as a key code embodied in an RF, IR, UHF, or other signal. In embodiments, a key code is associated with a specific channel or specific content location.

In embodiments, each of one or more tuners 250 can be tuned to a frequency associated with a downstream channel and can be used to receive content associated with the downstream channel. It should be understood that each of the one or more tuners 250 can be tuned to a different channel. In embodiments, a tuner 250 can tune to a channel in response to a subscriber request received from a controller 260 or a client device 160*a-d*. In embodiments, a subscriber request can cause a tuner 250 to reserve a period of time during which the tuner 250 is to be tuned to a channel specified in the subscriber request (e.g., where a subscriber schedules a program to be recorded on a STB 110).

In embodiments, the network interface can be used to receive a command (e.g., a content request such as a request for live or stored content received from a designated channel or received in an IP packet stream) from and/or to output content to a networked client device 160*a-d*. For example, a subscriber request for content can be received from a client device 160*a-d* as a URI request. In embodiments, the URI request is a character string identifying a network resource, a channel, specific content, and/or content sources. For example, the URI request can identify a channel and/or content within a channel and/or content directory.

In embodiments, the key code synthesizing module 230 can determine a channel or content location associated with a received URI request. For example, the key code synthesizing module 230 can identify a channel and/or content associated with a resource, channel or content identified by a received URI request. The association between a received URI request and a channel and/or content can be based upon a channel and/or content directory (e.g., content directory service).

In embodiments, the key code synthesizing module 230 can determine a key code associated with a channel or content location. For example, the key code synthesizing module 230 can identify a key code associated with the specific channel or content location associated with the received subscriber request and can output the identified key code to the user interface 210. In embodiments, the key code synthesizing module 230 generates a key code corresponding to a resource, channel or content identified by a received URI. In embodiments, the synthesized key code is passed to the user interface 210.

In embodiments, the key code synthesizing module 230 can add key codes associated with commands to the synthesized key code, the commands being associated with actions to be undertaken by a corresponding STB 110. For example, key codes associated with a number of commands for exiting out of a user guide or menu can be placed before the key code associated with the requested channel or content location in the synthesized key code. As another example, one or more key codes associated with a command for exiting out of a power-saving mode can be placed in the synthesized key code before the key code associated with the requested channel or content location. A key code associated with exiting out of a power-saving state can be added to a synthesized key code when the determination is made that a corresponding STB 110 is in a power-saving state.

In embodiments, a STB 110 executes one or more commands within the synthesized key code in the order that they are received. For example, when a STB 110 receives a synthesized key code having one or more "exit" commands before key codes associated with a channel request, the STB 110 can execute the one or more "exit" commands before causing a tuner to be tuned to a frequency associated with the requested channel. As another example, when a STB 110 receives a synthesized key code having a command to exit out of a power-saving state, the STB 110 can exit out of a power-saving state before causing a tuner to be tuned to a frequency associated with the requested channel.

In embodiments, the user interface 210 can receive key codes from a controller 260 and/or the key code synthesizing module 230 and can output received key codes to the conflict resolution module 240. In embodiments, the conflict resolution module 240 can resolve conflicts between commands (e.g., content requests) received as key codes (e.g., requests received from the remote 260) and those received as URIs (e.g., key codes received by the user interface 210 from the synthesizing module 230). For example, the conflict resolution module 240 can change the frequency to which a tuner is tuned, stop or cancel a recording of content received through a tuner, and/or reject a content request. In embodiments, decisions made at the conflict resolution module 240 can be made based upon a priority level given to the device requesting content. For example, content requests (e.g., request to change a channel or to record content from a channel) received from a subscriber through a controller 260 can be given higher priority than content requests received from a networked client device 160*a-d*. In embodiments, the conflict resolution module 240 can resolve content requests for content or channels that are blocked or otherwise unavailable to the subscriber.

Figure 3:
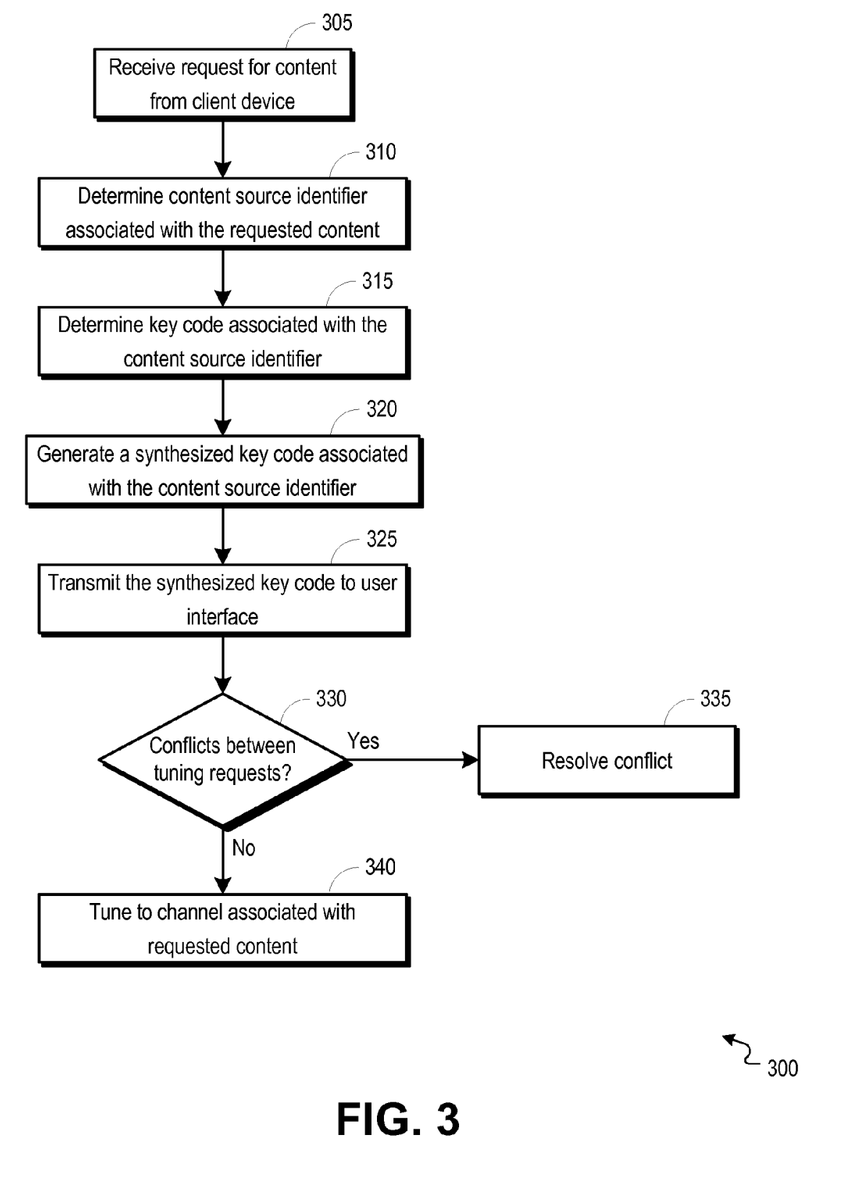
FIG. 3 is a flowchart illustrating an example process operable to facilitate the tuning of a STB using a synthesized key code.

FIG. 3 is a flowchart illustrating an example process 300 operable to facilitate the tuning of a STB using a synthesized key code. The process 300 can begin at 305, when a STB 110 of FIG. 1 receives a request for content from a client device (e.g., networked client device 160*a-d* of FIG. 1). For example, a STB 110 can receive a request for content from a networked client device 160*a-d* through a network interface 220 of FIG. 2. In embodiments, the request for content is a request for content from a specific channel or content location with the identification of the specific channel or content location being embodied in a URI.

At 310, a content source identifier associated with the requested content can be determined. A content source identifier (e.g., a channel number or storage location) associated with the requested content can be determined, for example, by a key code synthesizing module 230 of FIG. 2. For example, when the content request is embodied in a URI, a channel number or storage location associated with the requested content can be identified from the URI.

At 315, a key code associated with the content source identifier can be determined. A key code associated with the content source identifier can be determined, for example, by a key code synthesizing module 230 of FIG. 2. For example, a key code associated the content source identifier can comprise a command for a corresponding STB 110 to tune a tuner (e.g., tuner 250 of FIG. 2) to a channel identified by a received URI request or a command to output content from storage associated with the STB 110.

At 320, a synthesized key code associated with the content source identifier can be generated. A synthesized key code can be generated, for example, by a key code synthesizing module 230 of FIG. 2. In embodiments, the synthesized key code may include the key code associated with the requested content. In embodiments, the synthesized key code can include one or more key codes associated with commands, the commands being associated with actions to be undertaken by a corresponding STB 110. For example, key codes associated with a number of commands for exiting out of a user guide or menu, or a command for exiting out of a power-saving state can be placed within the synthesized key code before the key code associated with the requested content.

At 325, the synthesized key code can be output to a user interface application. The synthesized key code can be output, for example, to the user interface 210 of FIG. 2. In embodiments, the user interface 210 receives subscriber content requests from the key code synthesizing module 230 of FIG. 2 as well as a subscriber controller (e.g., controller 260 of FIG. 2).

At 330, a determination can be made whether a conflict exists between content requests (e.g., requests for a tuner to be tuned to a specific channel during a specific period of time). In embodiments, a STB 110 may have one or more tuners (e.g., tuners 250 of FIG. 2), and each tuner can be tuned to a different frequency associated with a different channel. When a content request is received and there are no free tuners available to be tuned to the requested channel, the determination can be made that a conflict between content requests exists. If the determination is made that a conflict between content requests exists, the process 300 can proceed to 335.

At 335, the conflict between content requests can be resolved. The conflict between content requests can be resolved, for example, by the conflict resolution module 240 of FIG. 2. In embodiments, a conflict between content requests can be resolved based upon a comparison of priority levels associated with the sources of the content requests. For example, a content request received from a controller 260 of FIG. 2 can be given higher priority than a content request received from a networked client device 160a-d of FIG. 1, thus a conflict arising between a content request received from a controller 260 and a request received from a client device 160a-d can be resolved in favor of the content request received from the controller 260. In embodiments, a conflict between content requests can be resolved based upon various other factors such as, timing of the received content requests, whether the content request is for content that is to be recorded or content that is to be viewed live, and others. In embodiments, a conflict can arise between a content request received from a client device 160a-d and settings associated with the STB 110 that block content associated with the content request (e.g., parental control settings, content unavailable due to a subscription level, content requiring a purchase, etc.). Based upon the outcome of the conflict resolution, the conflict resolution module 240 can take a variety of actions. For example, if the received content request does not have priority over any of one or more content requests occupying one or more tuners, the conflict resolution module 240 can deny the received content request and can cause a message to be output to the requesting subscriber, the message informing the requesting subscriber that other, higher priority content requests are occupying the available one or more tuners. In embodiments, the message to the requesting subscriber can provide the subscriber with the option to override the determination of the conflict resolution module 240 and to alter the priority levels of the conflicting content requests. Further input can then be received by the STB 110 from the subscriber, the input informing the STB 110 to either change the priority levels of the conflicting content requests or to maintain the priority levels of the conflicting requests. As another example, if the received content request does have priority over any of one or more content requests occupying one or more tuners, the conflict resolution module 240 can cause one of the one or more tuners to be adjusted to receive a frequency corresponding with a requested channel, the tuner having been tuned to a channel associated with a content request over which the received content request has priority.

Returning to 330, if the determination is made that no conflicts between content requests exist, the process 300 can proceed to 340. At 340, a tuner (e.g., tuner(s) 250 of FIG. 2) can be adjusted to receive a frequency associated with the requested channel.

Figure 4:
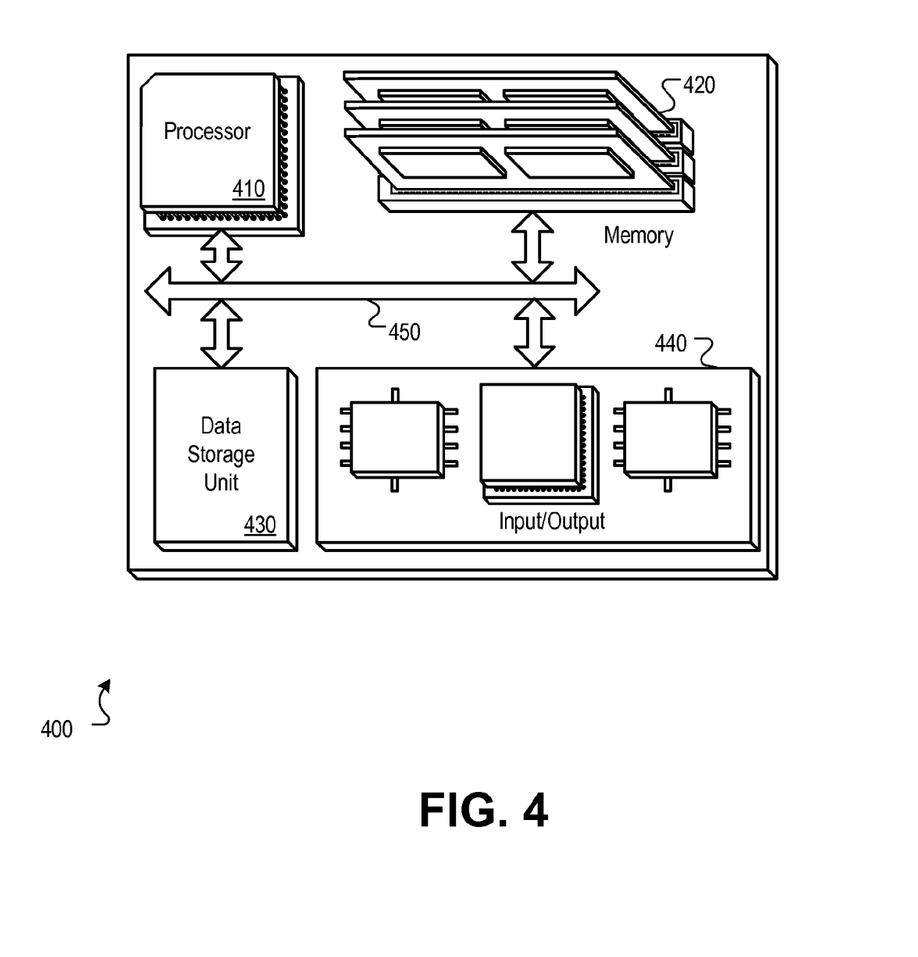
FIG. 4 is a block diagram of a hardware configuration operable to facilitate the tuning of a STB using a synthesized key code.

FIG. 4 is a block diagram of a hardware configuration 400 operable to facilitate the tuning of a STB using a synthesized key code. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a subscriber device (e.g, television 150 of FIG. 1, client devices 160a-d of FIG. 1, etc.). In another implementation, the input/output device can include driver devices configured to send communications to, and receive communications from one or more networks (e.g., network 140 of FIG. 1).

Those skilled in the art will appreciate that the invention improves upon methods and systems for integrating and coordinating content requests received by a STB from multiple devices. The methods, systems, and apparatuses described in this disclosure enable the integration and coordination of content requests received from different devices by associating a content request with a key code and generating a synthesized key code. The synthesized key code can be customized according to a status of a corresponding STB.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a first command at a customer premise equipment device, the first command being received from a first device, wherein the first command is associated with a first content source and is received at the customer premise equipment device as a uniform resource identifier;
   identifying the first content source based upon an association between the uniform resource identifier and the first content source;
   based upon the identification of the first content source, determining a key code associated with the first content source, wherein the key code comprises a content source identifier associated with the first content source and one or more commands instructing the customer premise equipment device to output content from the first content source to a requesting device, wherein the key code is formatted as an infrared signal that is expected to be received at the customer premise equipment device as a request for content from the first content source;

generating, at the customer premise equipment device, a synthesized key code comprising the key code associated with the first content source, wherein the synthesized key code is operable to control the customer premise equipment device;

outputting the synthesized key code to an interface module of the customer premise equipment device, wherein the interface module is configured to process infrared commands received at the customer premise equipment device from a remote control unit; and retrieving, at the customer premise equipment device, content associated with the first content source.

2. The method of claim 1, further comprising:

receiving a second command at the customer premise equipment device, the second command being received from a second device, wherein the second command is associated with a second content source;

determining that a conflict exists between the first command and the second command;

determining a priority level for the first command;

determining a priority level for the second command; and denying the command having the lower priority level.

3. The method of claim 2, wherein the priority levels for the first and the second commands are based upon the types of devices from which the commands are received.

4. The method of claim 2, wherein the second device comprises a remote control associated with the customer premise equipment device, the first device comprises a client device that is connected to the same network as the customer premise equipment device, and the priority level for the second command is determined to be higher than the priority level for the first command.

5. The method of claim 1, wherein the synthesized key code further comprises an action to be undertaken by the customer premise equipment device.

6. The method of claim 5, wherein the action to be undertaken by the customer premise equipment device is exiting a menu.

7. The method of claim 1, further comprising:

determining that the customer premise equipment device is in a power-saving state; and wherein the synthesized key code further comprises a command for removing the customer premise equipment device from the power-saving state.

8. An apparatus comprising:

an interface configured to be used to receive a first command, the first command being received from a first device, wherein the first command is associated with a first content source and is received as a uniform resource identifier; and a synthesizing module configured to:

identify the first content source based upon an association between the uniform resource identifier and the first content source;

based upon the identification of the first content source, determine a key code associated with the first content source, wherein the key code comprises a content source identifier associated with the first content source and one or more commands instructing the apparatus to output content from the first content source to a requesting device, wherein the key code is formatted as an infrared signal that is expected to be received at the apparatus as a request for content from the first content source; and generate a synthesized key code comprising the key code associated with the first content source, wherein the synthesized key code is operable to control the apparatus; and one or more tuners configured to retrieve content associated with the first content source.

9. The apparatus of claim 8, further comprising:

an interface configured to be used to receive a second command, the second command being received from a second device; and a conflict resolution module configured to:

determine that a conflict exists between the first command and the second command;

determine a priority level for the first command;

determine a priority level for the second command; and deny the command having the lower priority level.

10. The apparatus of claim 9, wherein the priority levels for the first and the second commands are based upon the types of devices from which the commands are received.

11. The apparatus of claim 9, wherein the second device comprises a remote control associated with the customer premise equipment device, the first device comprises a client device that is connected to the same network as the customer premise equipment device, and the priority level for the second command is determined to be higher than the priority level for the first command.

12. The apparatus of claim 8, wherein the synthesized key code comprises a command causing the apparatus to exit a menu.

13. The apparatus of claim 8, further comprising:

a status module configured to determine that the apparatus is in a power-saving state; and wherein the synthesized key code further comprises a command causing the apparatus to exit the power-saving state.

14. One or more non-transitory computer readable media having instructions operable to cause one or more processors to perform the operations comprising:

receiving a first command at a customer premise equipment device, the first command being received from a first device, wherein the first command is associated with a first content source and is received at the customer premise equipment device as a uniform resource identifier;

identifying the first content source based upon an association between the uniform resource identifier and the first content source;

based upon the identification of the first content source, determining a key code associated with the first content source, wherein the key code comprises a content source identifier associated with the first content source and one or more commands instructing the customer premise equipment device to output content from the first content source to a requesting device, wherein the key code is formatted as an infrared signal that is expected to be received at the customer premise equipment device as a request for content from the first content source; and generating, at the customer premise equipment device, a synthesized key code comprising the key code associated with the first content source, wherein the synthesized key code is operable to control the customer premise equipment device;

outputting the synthesized key code to an interface module of the customer premise equipment device, wherein the interface module is configured to process infrared commands received at the customer premise equipment device from a remote control unit; and retrieving, at the customer premise equipment device, content associated with the first content source.

15. The one or more non-transitory computer-readable media of claim 14, wherein the instructions are further operable to cause one or more processors to perform the operations comprising:

receiving a second command at the customer premise equipment device, the second command being received from a second device, wherein the second command is associated with a second content source;

determining that a conflict exists between the first command and the second command;

determining a priority level for the first command;

determining a priority level for the second command; and denying the command having the lower priority level.

16. The one or more non-transitory computer-readable media of claim 15, wherein the priority levels for the first and the second commands are based upon the types of devices from which the commands are received.

17. The one or more non-transitory computer-readable media of claim 15, wherein the second device comprises a remote control associated with the customer premise equipment device, the first device comprises a client device that is connected to the same network as the customer premise equipment device, and the priority level for the second command is determined to be higher than the priority level for the first command.

18. The one or more non-transitory computer-readable media of claim 14, wherein the synthesized key code further comprises an action to be undertaken by the customer premise equipment device.

19. The one or more non-transitory computer-readable media of claim 18, wherein the action to be undertaken by the customer premise equipment device is exiting a menu.

20. The one or more non-transitory computer-readable media of claim 14, wherein the instructions are further operable to cause one or more processors to perform the operations comprising:

determining that the customer premise equipment device is in a power-saving state; and wherein the synthesized key code further comprises a command for removing the customer premise equipment device from the power-saving state.

* * * * *